United States Patent [19]

Bouteyre

[11] Patent Number: 5,448,352
[45] Date of Patent: Sep. 5, 1995

[54] METHOD AND APPARATUS FOR THE NONDESTRUCTIVE TESTING OF VESSELS MADE OF COMPOSITE MATERIAL WOUND ON A METALLIC LINER BY MEANS OF HOLOGRAPHIC INTERFEROMETRY

[75] Inventor: Jacques Bouteyre, Saint Medard En Jalles, France

[73] Assignee: Societe Anonyme Aerospatiale Societe Nationale Industrielle, Paris Cedex, France

[21] Appl. No.: 359,859

[22] Filed: Dec. 20, 1994

Related U.S. Application Data

[63] Continuation of Ser. No. 833,135, Feb. 10, 1992, abandoned.

[30] Foreign Application Priority Data

Feb. 13, 1991 [FR] France ................... 91 01982

[51] Int. Cl.[6] .................................. G01B 9/02
[52] U.S. Cl. ...................... 356/347; 356/35.5; 356/348
[58] Field of Search .............. 356/35.5, 347, 348; 73/800

[56] References Cited

U.S. PATENT DOCUMENTS

| | | |
|---|---|---|
| 3,644,047 | 2/1972 | Brown et al. |
| 3,681,970 | 8/1972 | Wells .................. 73/15.4 |
| 3,711,202 | 1/1973 | Rush et al. ........... 356/347 |
| 3,797,938 | 3/1974 | Heflinger ............. 356/348 |
| 3,938,889 | 2/1976 | McKinnis ............. 356/347 |
| 3,976,380 | 8/1976 | Rottenkolber et al. |
| 4,234,256 | 11/1980 | Yeager. |
| 4,506,981 | 3/1985 | Hoff, Jr. |
| 4,999,681 | 3/1991 | Mader ................. 356/347 |

FOREIGN PATENT DOCUMENTS

| | | |
|---|---|---|
| 2048189 | 3/1971 | France. |
| 2568026 | 1/1986 | France. |
| 2018455 | 10/1979 | United Kingdom. |
| 2021802 | 12/1979 | United Kingdom. |

OTHER PUBLICATIONS

Applied Optics, vol. 21, No. 20, Oct. 1982, New York Wagner et al.; Using Optical Correlation to Measure Leak Rates in Sealed Packages.

Primary Examiner—Samuel A. Turner
Assistant Examiner—Robert Kim
Attorney, Agent, or Firm—Sandler, Greenblum & Bernstein

[57] ABSTRACT

A vessel made of composite material wound on a metallic liner is tested via holographic interferometry, in which the interference of two holographic images of a tested zone are taken under two different states of thermal cycling. The thermal cycling is homogeneously applied to the entire liner, via a heated fluid placed inside the vessel. The interferogram is made outside the vessel, where a second image is made after having raised the liner to a temperature different from the one duly measured when the first image is made. The second image shot is controlled by the detection, outside and near the vessel, of a variation of the outer infrared radiation emitted by the vessel, resulting from the liner temperature variation being equal to a predetermined threshold value.

24 Claims, 7 Drawing Sheets

FIG_1_

FIG.-2-

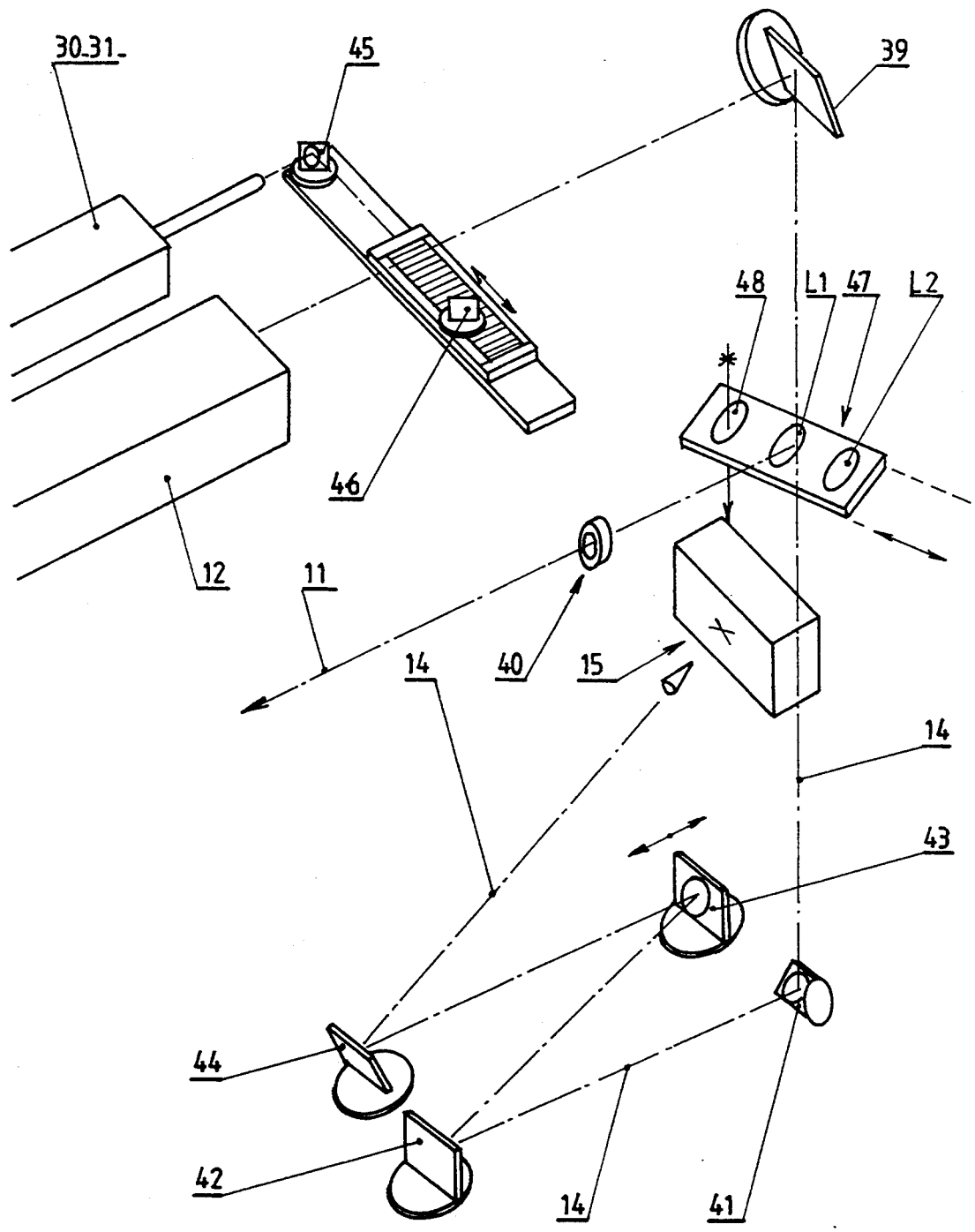
FIG_4_

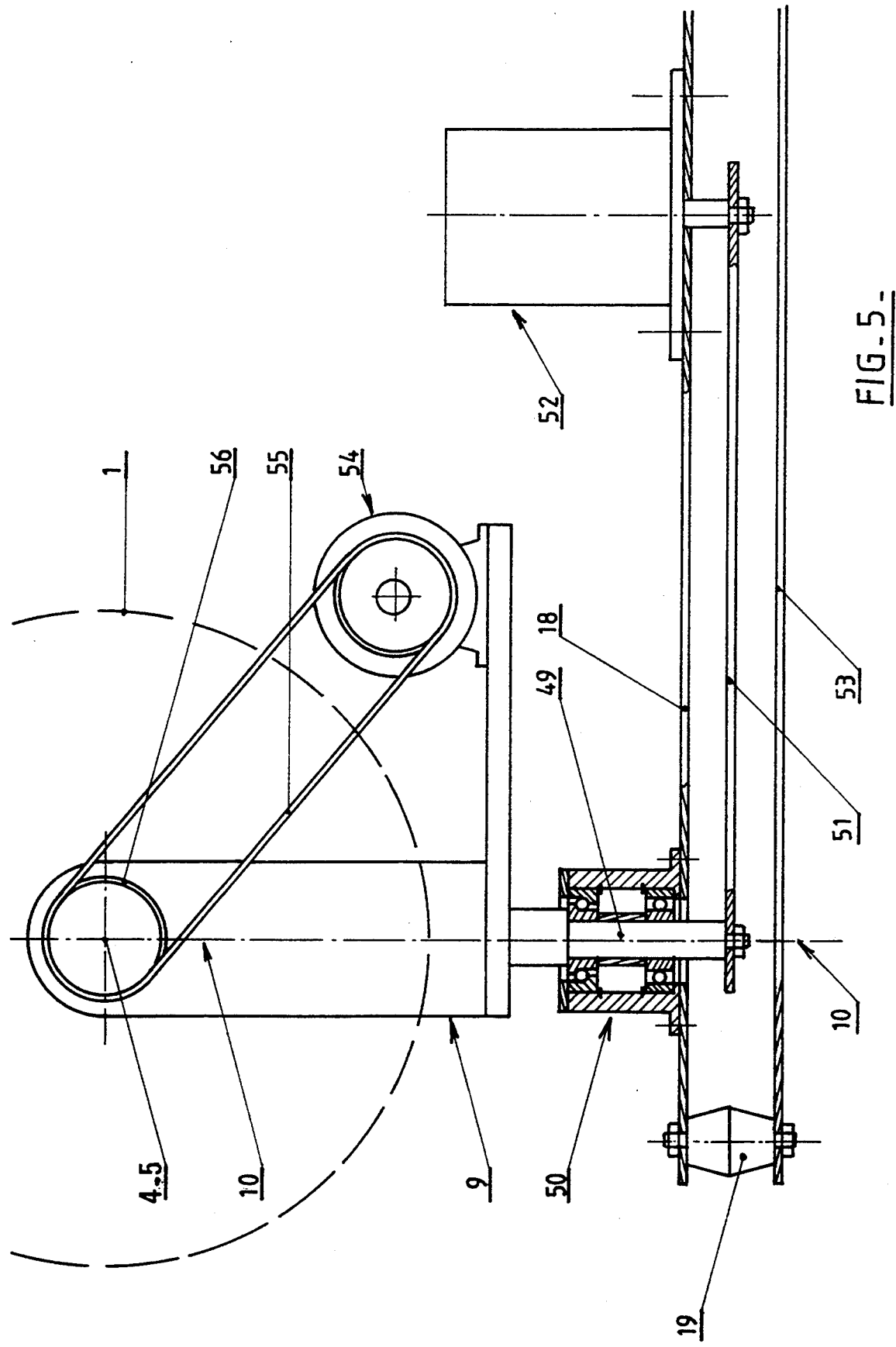
FIG_5_

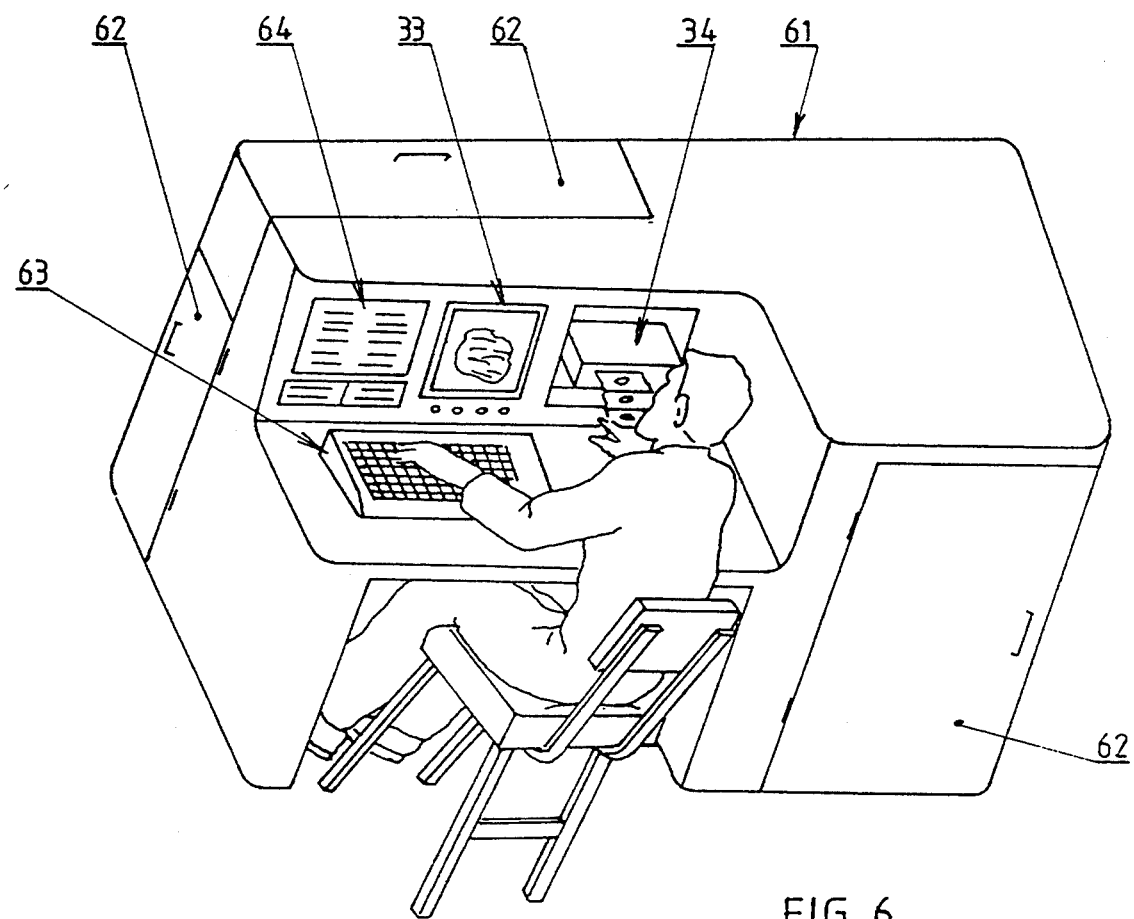
FIG_6_
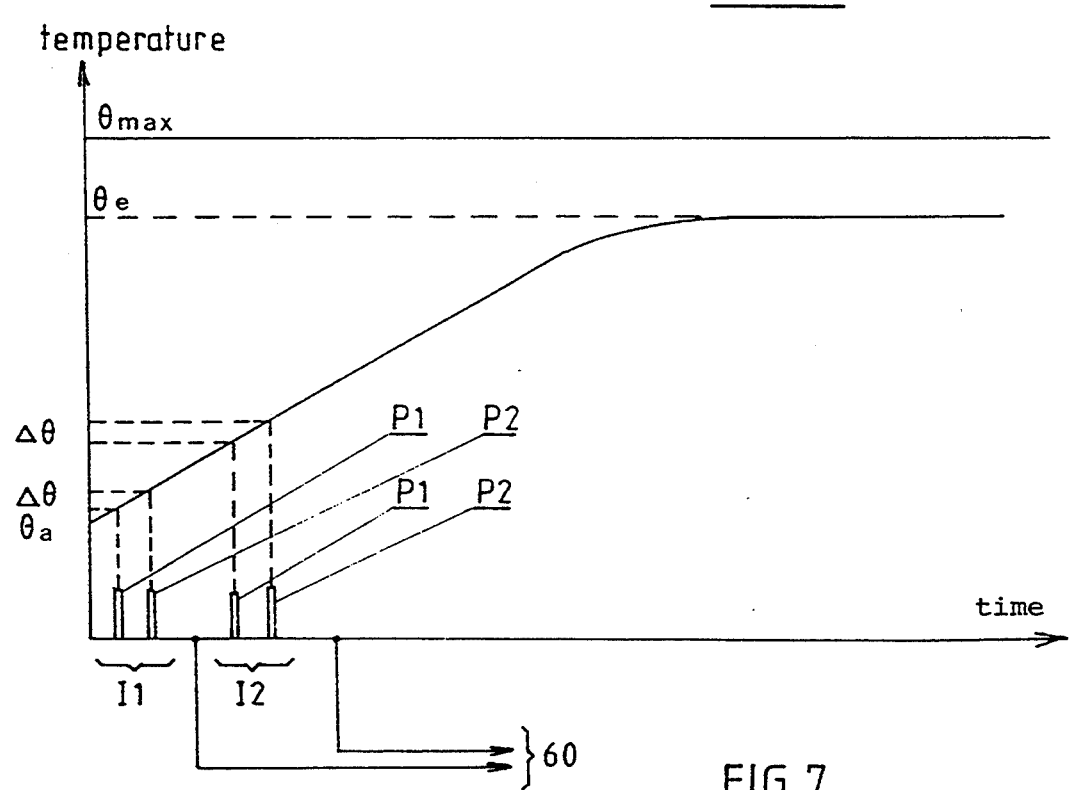
FIG_7_

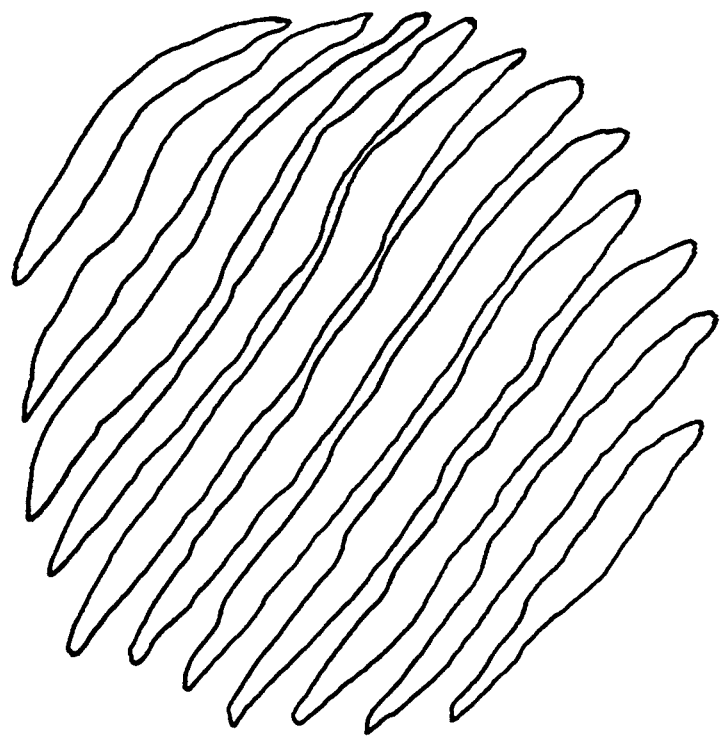
FIG._8_
FIG.9_

METHOD AND APPARATUS FOR THE NONDESTRUCTIVE TESTING OF VESSELS MADE OF COMPOSITE MATERIAL WOUND ON A METALLIC LINER BY MEANS OF HOLOGRAPHIC INTERFEROMETRY

This application is a continuation of application Ser. No. 07/833,135, filed Feb. 10, 1992, now abandoned.

The present invention relates to the nondestructive testing of vessels made of composite material wound on a metallic liner by means of holographic interferometry.

The vessels made of composite material wound on metallic liner, such as, for example, tanks used for high-pressure gas storage in space technology, consist of a liner, a titanium liner for example, which ensures a tightness function, the outer part being covered with a wound composite material shell, possibly made of "Kevlar" or carbon, ensuring the mechanical resistance of the whole system particularly to pressure.

The tanks may have various shapes, spherical or cylindro-spherical shapes for example, with varying diameters of about a few tens of centimeters.

In order to increase the linear operating range of the liner metal so that it is brought as close as possible to that of the shell fiber, the liner is subjected to a preliminary stress by inflating the tanks beyond the metal elastic limit.

The latter buckles irreversibly, and, when the inner pressure is removed, the liner is then compressed whereas the composite material remains slightly in tension.

Such operation may cause local inner flaws which are called bucklings, to appear on the liner.

Those bucklings create local inner folds on the liner forming kinds of blisters whose variable form may cover a surface of about 50 mm in diameter whose height may reach about ten millimeters.

Bucklings can create fragile zones liable to cause ruptures of the liner by crushing it while the tank is being operated, as a consequence of its high operating pressure for example in the order of 300 bars. Such local ruptures of the liner inevitably cause the gas contained in the tank to escape.

It is therefore necessary to detect the bucklings, at least those whose surfaces and sizes exceed ten millimeters in diameter.

So far, an ultrasonic method has been used for this purpose. However nondestructive, such a method is valid for small sized objects, but is not suited for testing large sized objects since it excessively increases testing time and is difficult to carry out.

Actually, one must use an ultrasonic probe whose small surface end must be applied against the outer side of the tank to be tested, holding the probe at a right angle with respect to the sounded and motionless surface while recording the echo of the probe for each application on said surface. One can easily imagine the time required to sound in this and step by step manner, the entire outer surface of a spherical tank having approximately a 650 mm outer diameter, for example.

The task is further complicated by the uneven outer surface of the composite shell, particularly near the poles of the tanks, due to the method used for winding the fiber layers. This wavy surface making it difficult to position the ultrasonic probe correctly and to obtain a reliable measurement.

Finally, the interpretation of the probe echoes requires sophisticated equipment and skilled personnel.

One could consider transposing the known nondestructive testing techniques to the testing of tanks of the above-mentioned type, by means of holographic interferometry.

Holographic interferometry is a well-known optical image formation technique which is based on the use of a coherent light generated by a laser emitter.

The beam emitted by the laser is split into an object beam and a reference beam. The object beam is directed toward the object to be tested, and the wave front reflected from the object is recorded on a photosensitive recording element or holographic plate, while the reference beam is directed onto said holographic plate.

As a result of the difference in the path length of the object and reference beams, the interference between both coherent waves onto the holographic plate fixes the differences in light amplitude thereon, namely the coding of the phase, thanks to amplitude modulation, in the form of fringes making a hologram.

After developing the holographic plate, if the latter is illuminated with a monochromatic light from the same angle as that of the reference beam, a three-dimensional image is produced.

The so-called double exposure holographic interferometry consists of superimposing two holograms of the same object submitted to two very close states of stress, on the same holographic plate. Usually, the first state of stress corresponds to a lack of stress, whereas, in the second state, the object is subjected to a stress or strain which, in the presence of homogeneity flaws in the object, such as breaks, fissures or detachments, will cause a non-homogeneous deformation of the object which will be revealed by singularities on the interferogram fringe pattern and consequently be easily observed.

Holographic interferometry has already been the subject of several applications to nondestructive testing of objects or structures.

In accordance with patent FR 84 11450 which was filed by the applicant, there is provided a description of the method for testing by means of holographic interferometry the detachment of the inner covering of hollow components or tanks in which the holographic camera is introduced into the chamber to be tested and interferograms are made under two states of pressure from inside the chamber. More particularly, the first exposure of the interferogram is made under ambient pressure whereas the second exposure is made under low pressure.

Unfortunately, this process cannot be transposed to the testing of tanks of the type mentioned herein, because, on the one hand, the access and the dimensions of such tanks make it impossible to introduce a holographic camera, and, on the other hand, because it is quite out of the question to subject the inner surface of the tanks to depressions which might tend to increase or even create bucklings. Nor could one consider exerting pressure inside the tanks since it is not likely to generate variations in the isodisplacement lines on the outer surface of the tanks, which could be detected and exploited by means of holographic interferometry.

Direct or time lapse holographic interferometry has already been used for testing objects subjected to thermal cycling.

In U.S. Pat. No. 3,681,970 there is described a method which is intended for the testing of a metal structure under thermal cycling and for the detection of potential local inner flaws by means of direct or time lapse holographic interferometry.

To that end, heat is locally induced inside the metal structure, and the dimensional variations of the outer surface are observed. The heat, while migrating toward the structure outer surface, will be almost slowed down by the presence of an air pocket, for example, and temperature differentials thus will appear on the outer surface thereby creating local expansion differences to be detected by holographic interferometry.

Such a method of using a local heat injection by means of electric induction allows testing of only a very small surface, and so cannot be used for testing large surfaces, just like the abovementioned ultrasonic probe testing.

U.S. Pat. No. 3,976,380 also describes a method for the nondestructive testing of objects subjected to thermal variations by means of real time holographic interferometry in order to detect possible inner flaws. Heat is applied by conduction or convection onto the object, and onto the entire object mass. The method more particularly concerns the testing of an object made of a single material, the purpose being to detect flaws in the homogeneity of the material.

It is an object of the present invention to apply time lapseo-holographic interferometry, under thermal cycling, to the detection of possible bucklings in vessels made of a composite material wound on metallic liner.

The invention particularly aims at proposing a truly industrial method allowing rapid and reliable testing of the entire wall of tanks, more particularly made of composite material wound on a metallic liner and, preferably, to carry out that test systematically and automatically.

To that end, the invention relates to a method for holographic interferometry nondestructive testing of vessels made of composite material wound on a metallic liner, in which one causes the interference of two holographic images of the same zone to be tested, taken under two different states of thermal cycling, wherein the thermal cycling is homogeneously applied to the entire liner inside the vessel and the interferogram is made outside the vessel, wherein the second image is made after having raised the liner to a temperature different from the one duly measured when the first image was made, and, wherein the taking of the second image shot is controlled by the detection, outside and near the vessel, of a variation of the outer infrared radiation emitted by the vessel, resulting from the temperature variation undergone by the liner, being equal to a predetermined threshold.

Such method allows one to obtain a fringe network which accounts for the isodisplacement lines of the observed zone under thermal cycling. More precisely, where a flaw exists in the observed zone, such as buckling between the liner and the outer composite shell, the isodisplacement lines are disturbed because the thermal front which crosses the wall of the checked vessel, from the inside to the outside, is slowed down by a thermal resistance phenomenon due to the presence of the pocket formed by said buckling and acting as an insulating zone.

Consequently, the zone of the composite shell corresponding to the buckling is deformed and displaced differently from the nearby zones, this being revealed by the interferogram through local flaws in the fringe network.

The application of a thermal cycling inside the vessel, for example by means of a fluid, so as to raise the entire mass of the liner homogeneously to the temperatures required for holographic exposure, allows the holographic camera to take a panoramic shot of a very wide surface of the outside the vessel, or even the entire observable part of the vessel in its shot, hence to rapidly and reliably test the said observable surface with a very small number of interferograms, or even just one interferogram.

The fluid applied inside the vessel is preferably air at a temperature which is higher than the temperature prevailing in the vessel at the time of the first exposure, and which is compatible with the nature of the composite material. However, it is possible to consider the application of a fluid at a lower temperature than the one prevailing in the vessel at the time of the first exposure.

The method can advantageously be applied to the automatic and continuous testing of the entire outer surface of vessels generated by rotation, vessels of spherical or cylindro-spherical type for example, by applying a fluid at a controlled temperature into the inside the vessel in order to steadily raise or lower the temperature inside the vessel, for a period of time long enough to make several interferograms successively, each one being related to a given fraction of the outer surface of the vessel. The number of interferograms corresponds to the number of the various surface fractions necessary to cover the said entire outer surface of the vessel.

Preferably, the application of fluid at controlled temperature inside the vessel is carried out prior to the exposure of the first interferogram, in order to make said exposure of the first image at a temperature inside the vessel slightly higher or lower than the ambient temperature.

In case the temperature should rise inside the vessel, such a temperature increase will be checked so that, after the last interferogram, the final temperature of the vessel is substantially within the limit which would be otherwise detrimental to the composite material.

The fluid injected into the vessel is, for example, clean, dust-free, dehumidified air which is heated at a controlled temperature higher than ambient temperature, then introduced into the vessel and immediately extracted according to a controlled steady flow.

The method of the invention calls for the known technique of making interferograms in situ, thus allowing a rapid and automatic test of an entire spherical tank, for example, by making six interferograms within approximately one hour, the various interferograms being, also in a known manner, almost instantaneously controlled with a video camera placed behind the holographic camera and associated with a picture monitor, by an operator who is not necessarily an expert in holography.

The invention also concerns an installation for the automatic testing of vessels made of composite material wound on a metallic liner using the method above described.

Other characteristics and advantages of the invention will stand out from the following description of one embodiment of such installation, such description being given as an example only and referring to the accompanying drawings wherein:

FIG. 4 illustrates a detailed view of the optical application of the laser arrangements according to a specific embodiment of the invention;

FIG. 5 is a diagrammatic view illustrating an embodiment of the supporting and positioning means of a vessel to be tested;

FIG. 6 is a perspective view of a tank testing module or protective case for carrying out the method of the invention;

FIG. 7 is a chronogram showing successive interferogram shots according to the invention;

FIG. 8 illustrates an interferogram of a sound zone free from buckling, and

FIG. 9 illustrates an interferogram of a defective zone.

Figure 1:
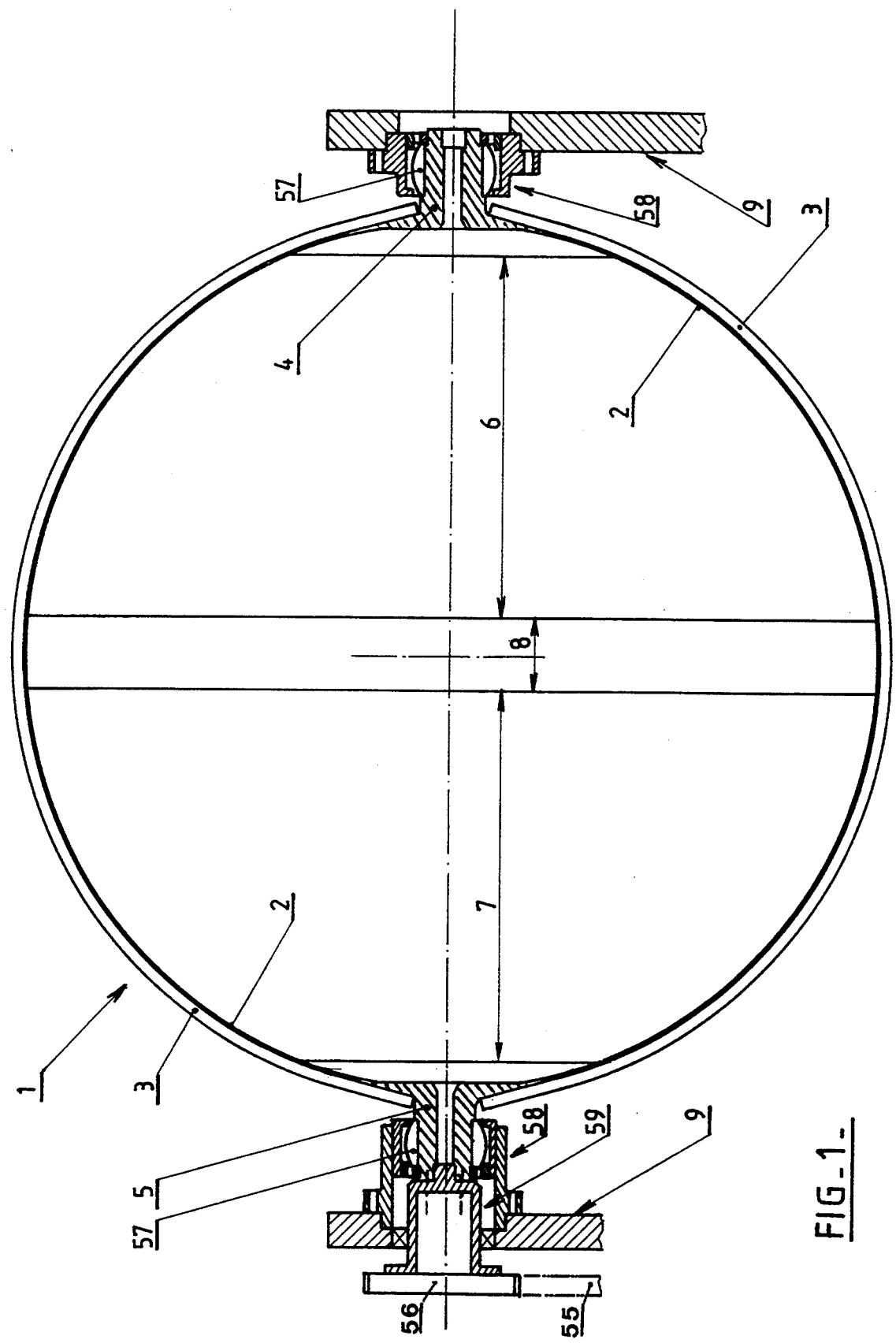
FIG. 1 is a schematic cross-sectional view across a diameter of a spherical tank made of composite material wound on a metallic liner.

FIG. 1 illustrates a cross-sectional view across a diameter of a spherical tank 1, having an outer diameter of 650 mm and consisting of a metallic liner 2, made, for example, of titanium, which is approximately 1 mm thick, and on which a filament covering 3, made of Kevlar ® aramid, for example, has been wound. On two diametrical spots of the sphere 1, called poles, there are provided two tubular trunnions 4 and 5 integral with the liner 2, used for supporting and rotating the liner to be wound. One of the trunnions will be later closed, whereas the other will receive an adapter for filling and emptying the tank.

The bucklings liable to appear on the liner 2 can be seen mainly on two symmetrical zones marked at 6 and 7 on FIG. 1, and corresponding to the total surface of the sphere reduced by the two poles caps which correspond to the strengthening zones of the liner thickness situated opposite the trunnions and a small equatorial belt 8. The latter corresponds to the connecting and welding zone of both hemispheres forming the liner 2, a zone which therefore offers a better rigidity and which is not liable to buckle.

In accordance with the invention, the detection method of possible buckling of the liner 2 consists in the interference of two holographic pictures of the same zone to be tested on the sphere 1. The pictures are taken under two different states on stress of the sphere, the stress applied being a thermal cycling exerted, according to an embodiment of the invention, via a fluid which is introduced inside the sphere at a temperature higher or lower than ambient temperature.

The invention will appear more clearly from the detailed description of an application to vessel testing, such as tanks, showing, for example, a spherical or cylindro-spherical form of rotation, for which it is necessary to explore almost the entire outer surface of the vessel to be tested, i.e., to place the vessel in various positions under a recording laser beam in order to cover the entire surface, step by step. If the zone to be tested can be entirely illuminated by the laser beam with a single pass, it will not be necessary to move the object to be tested, nor even provide the object thereof with controlled shifting supporting and positioning means.

Likewise, the invention will be described using air raised at a specified temperature higher than ambient temperature, as a fluid applying a thermal cycling, although it is also possible to use another gas, or a liquid such as water, for example.

Furthermore, the fluid which applies a thermal cycling also can be used at a temperature lower than ambient temperature.

Figure 2:
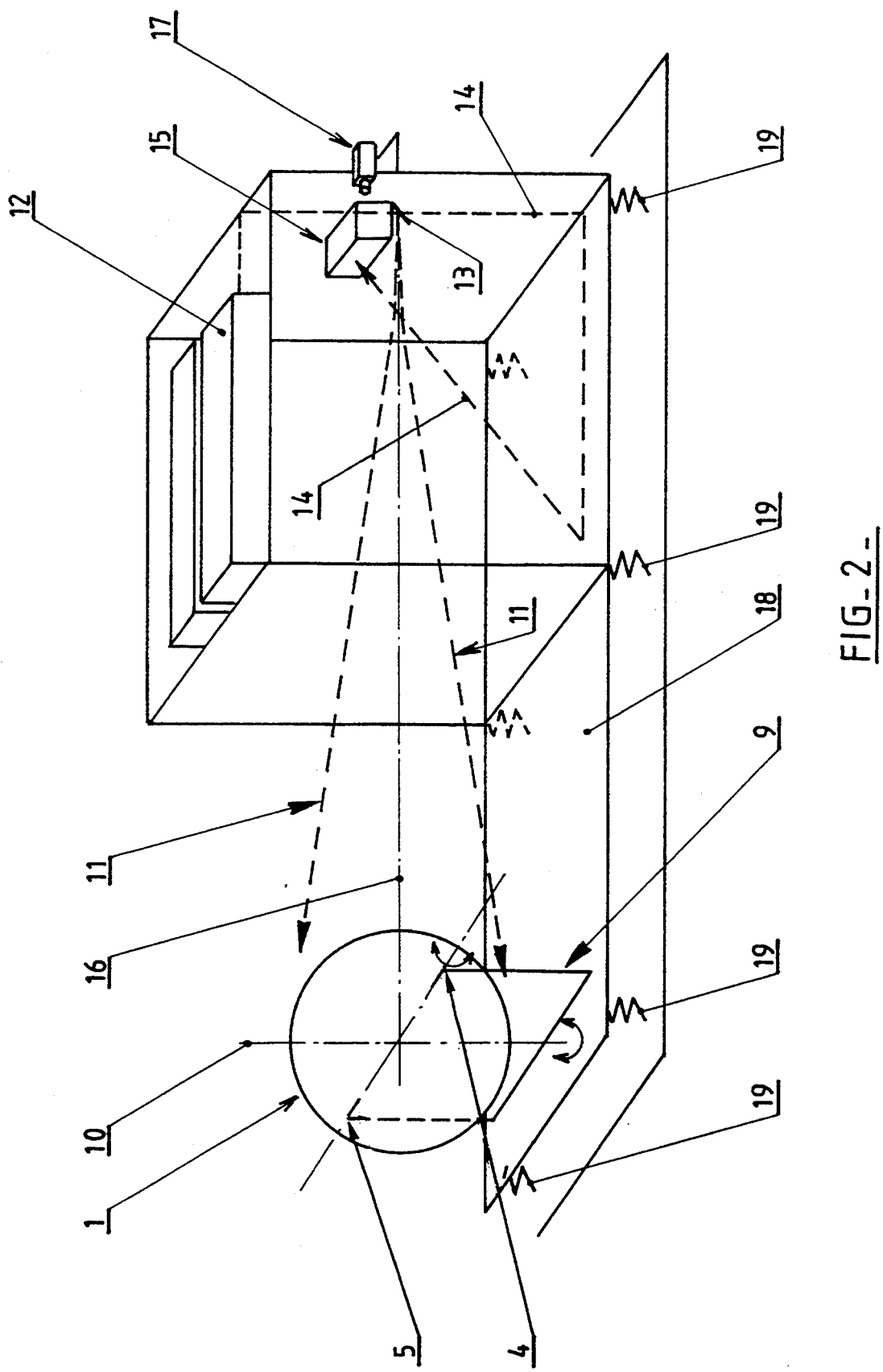
FIG. 2 is a diagram of a portion of an installation for the testing of tanks according to the invention.

FIG. 2 shows a spherical tank 1 of the FIG. 1 type, supported by a fork-shaped arrangement 9 whose both ends support the trunnions 4,5 of the sphere 1. The center of the sphere is on the vertical axis 10 of the fork.

Controlled shift drive means are provided in order to cause the axis 10 of the supporting and positioning arrangement 9 to rotate at the desired angle, in one direction or the other.

Likewise, one of the trunnion supports 4,5 is arranged so as to allow the sphere 1 to rotate in one direction or the other, to the desired degree, around the axis of the trunnions.

The sphere 1 is liable to be illuminated by a beam 11 of a recording or shooting laser 12.

The laser beam 12 is split, by separating plate 13, into a part forming the object beam 11 and another part forming the reference beam 14.

A thermoplastic film holographic camera 15 is placed near the separating plate 13 so that the sphere 1 can be seen slightly from the same angle as the object beam 11 whose axis is referenced in 16 and goes through the center of the sphere 1. The camera 15 receives the laser beam reflected from the sphere 1 as well as the reference beam 14, from a predetermined angle.

A display camera 17 placed behind the holographic camera records the image of the interferograms.

FIG. 2 shows only the parts of the testing installation which must be isolated from any vibration and which, thereby, should be mounted on a cushioned frame 18, being mounted on dampers 19. The holographic interferometry technique requires a high degree of stability of the optical elements and of the object being tested, as vibrations are particularly disastrous to the production of holograms.

The dampers 19 are for filtering vibration frequencies exceeding 5 Hz which come from the ground. Likewise, the motorization of the supporting and positioning arrangement movements of the sphere 1 should take this requirement into account and should be realized with slow damped stop motion devices, for example.

Figure 3:
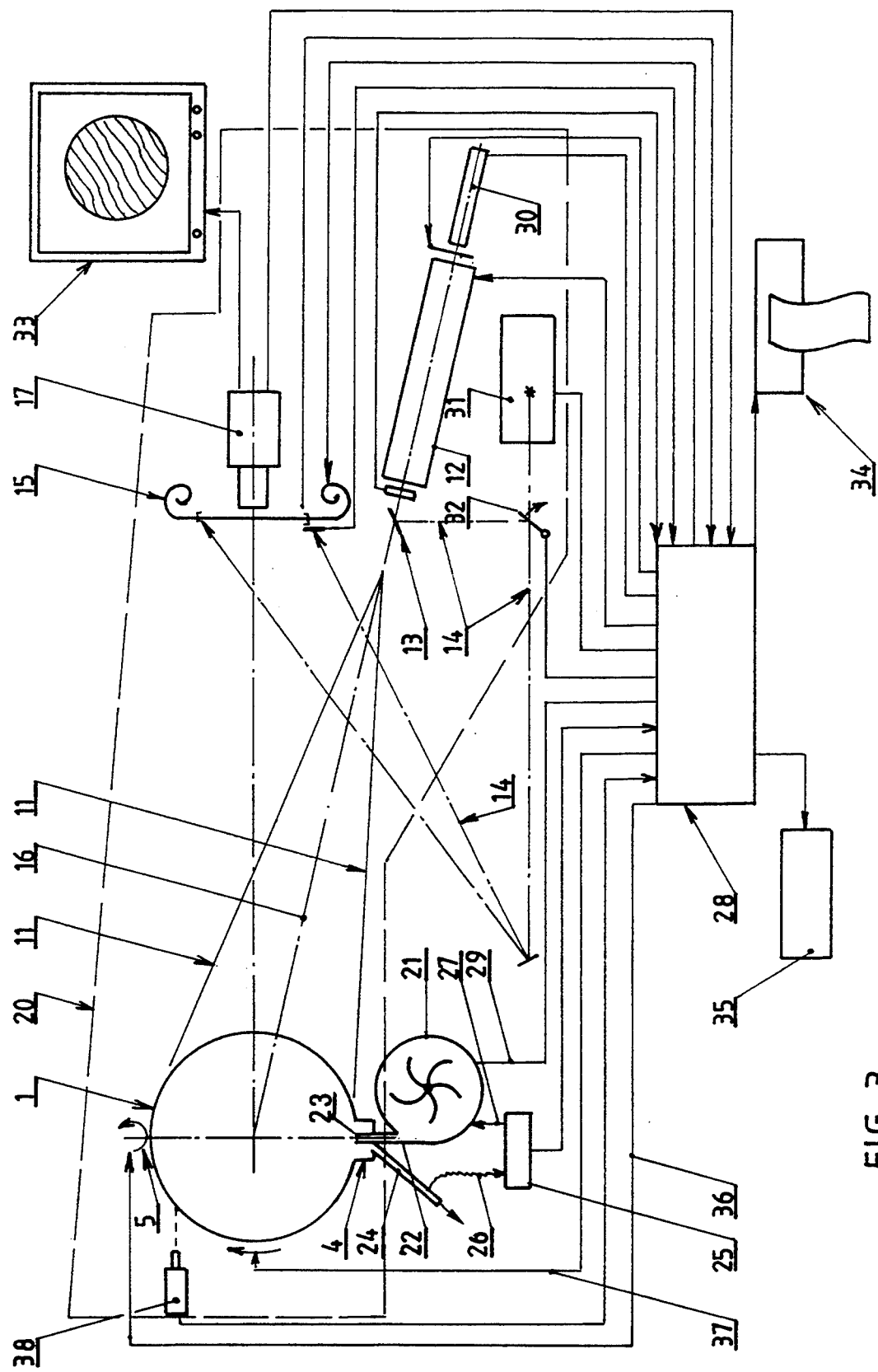
FIG. 3 is an overall diagram of an installation for the testing of tanks using the method of the invention.

FIG. 3 is an overall drawing of a testing installation using the method of the invention and including the elements of FIG. 2, which are isolated from ground vibrations and gathered inside box 20.

FIG. 3 illustrates a cross-section of a diameter of the sphere 1 with the axis of the poles 4,5 in the plane of the figure.

The holographic interferometry testing requires the application of a stress onto the object being tested.

In accordance with the invention, the stress is a thermal cycling homogeneously applied to the entire liner, and carried out by introducing air at a predetermined temperature inside the sphere, in order to define two different states of stress allowing the taking of holographic pictures of the sphere under the two states of stress.

Hot air is injected at a controlled temperature and flow rate, from an injection device 21, separated from the unit 20 and connected by a flexible hose 22 to an injection pipe 23 inside the sphere 1 which is placed, for example, in the trunnion 4. In order not to disturb the holographic environment, the end of the pipe 23 is designed as a diffuser so as to collect the air after it has circulated inside the sphere, the air being evacuated from the sphere through a second airing pipe 24.

A reverse feedback control loop 25 realized by a temperature measurement 26 at the sphere air outlet allows to regulate (27) the temperature of the air injected into and through the device 21.

A microcomputer 28 connected (via linkage 29) to the injection device 21 and to the reverse feedback control loop 25 allows regulation of the temperature and eventually the air flow injected into the sphere 1 so as to control the air temperature increasing slope inside the sphere as a function of time.

The optical circuit consists of a recording laser or shooting laser 12 made of, for example, a pulsed laser of the ruby type, whose beam path is materialized by a HeNe 30 graphic output laser unit. The optical application is arranged according to a folded cavity, with a reference arm 14 which is adjustable lengthwise.

The holographic recording system consists of the thermoplastic film camera 15. This well-known type of camera makes holograms in situ and in a very short time, thus allowing automatic preparation of successive interferograms within a substantially short time.

A proof-reading laser 31, for example of HeNe type, is similar to the graphic output laser unit 30, and has a wavelength as close as possible to the wavelength of the recording laser 12. The proof-reading laser 31 is directed to the reference beam 14 by means of a pivoting mirror 32.

The display camera 17, placed behind the thermoplastic film camera 15, is of the video or CCD type, for example, and it is connected to a control monitor 33. The camera 17 provides a means for recording the interferogram image, such image being digitized in an image-card placed in the microcomputer 28, the image being displayed on the monitor 33.

A printer 34 connected to the microcomputer 28, provides a means for editing a test record of the sphere 1, as is described below.

A streamer 35 provides means for making the necessary back-ups on the microcomputer 28.

The microcomputer 28 is connected to the rotation driving means of the sphere 1, around the axis of the poles or trunnions 4,5 (via linkage 36), and to the rotation driving means of the supporting and positioning means 9 (FIG. 2) of the sphere 1 (linkage 37).

Finally, an infrared radiation pyrometer 38, connected to the microcomputer 28, measures the infrared radiation of the sphere 1.

The pyrometer 38 is placed, for example, at a distance included between 100 and 500 mm from the sphere, in the shadow cone of the latter (with regard to the laser illumination).

FIG. 4 illustrates more details of a particular embodiment of the optical application of the installation of FIG. 2.

The beam from the recording laser 12 is reflected at 45° from a reflecting mirror 39 onto a separating plate 13' showing a specific design which represents another characteristic of the method of the invention.

The object beam 11, when coming out of the separating plate 13' goes through a diffused illumination set 40.

The reference beam 14 is reflected at 45° from a mirror 41, then from reflecting mirrors at 20° angles respectively fixed 42 and adjustable 43, allowing the optical application arms both to be of identical length (reference beam 14/object beam 11) and finally from a last reflecting mirror 44 toward the thermoplastic film camera 15.

In the arrangement shown on FIG. 4, one HeNe laser (30,31) only has the tracing and proof-reading functions of FIG. 3 lasers 30 and 31, respectively. To that end, the beam emitted by the laser 30, 31 is deviated at 45° by a mirror 45 onto a reflecting mirror 46 moving between two positions, one position on which the mirror is on the path of the beam emitted by the laser 12 and reflects the HeHe laser beam onto the mirror 39, and the other position on which the mirror is outside the beam path of the laser 12.

According to the invention, the separating plate 13' consists of (1) a moving small plate 47 supporting a coated glass plate 48, parallel to its plane and placed side by side, said plate allowing the entire beam to be reflected onto the reference arm 14 when proof-reading is carried out; (2) a separating plate L1 for testing a "Kevlar" surface; and (3) a separating plate L2 for testing carbon surface and eventually one or several other separating plates suited for other composite materials. A motor (not shown) allows, under the microcomputer 28 control, to move the small plate 47 in order to place either the separating plate L1 or L2, according to the nature of the composite material, or the proof-reading plate 48, in the beam reflected from the mirror 39. Such plates L1,L2 have different characteristics allowing to adjust the ratio reference beam 14/object beam 11 according to the type of the composite material.

The plate 48 provides the same optical path length on the reference arm 14, creating, when proof-reading is carried out, the same offset as the plates L1,L2 when recording is carried out due to the refraction.

FIG. 5 shows an embodiment of the supporting and positioning means of the sphere 1.

The fork-shaped support 9 consists of a vertical (upright) shaft 49, for example, journaled in a ball bearing system 50 which is fixed on the cushioned frame 18 and driven, at the lower end, through a chain drive 51, by a stepwise motor 52 which is also mounted on the frame 18, said frame being linked to the ground by dampers 19, said ground being represented on the drawing as a fixed frame 53.

The fork 9 also consists of a lateral extension supporting a stepwise motor 54 by means of a synchronous belt 55, for example, driving a pinion 56 fixed on the trunnions axis 4,5 and solid with the sphere 1.

The motor 52 provides the controlled rotation of the fork 9 around the vertical axis 10, whereas the motor 54 provides the controlled rotation of the sphere 1 around the horizontal axis through the trunnions 4 and 5.

The sphere 1 is mounted on the fork 9 by means of balls 57 fixed on the trunnions 4,5 and held up by retainers 58 fixed on the fork arm 9, as shown, for example, in FIG. 1.

One of the trunnions (4) is used as a passage for the diffusing pipe 23. In consideration of the narrowness of the passage, the pipe 23, which is a mere tube with a round end pierced with diffusing holes, is placed inside the conduct 24, also introduced in the trunnion 4 for collecting and evacuating the air outside the vessel.

The other trunnion (5) is connected to a driving hub 59, which is also connected to said rotating pinion 56 of the sphere 1.

The principle of the detection method of possible liner bucklings of the sphere 1 will be described hereafter according to the invention, as well as the automatic and systematical testing of the sphere with the installation shown on FIG. 3.

As described above, holographic interferometry is used under two different states of thermal cycling of the sphere 1, said thermal cycling being applied, in the example hereof, by means of an air flow injected inside the sphere at a specific temperature.

After a first holography of the sphere 1 surface illuminated by the recording laser 12, the sphere being under a first state of thermal cycling, a second holography of the same part of the surface is made while the sphere is under a second state of thermal cycling thanks to the presence of the air flow at a specific temperature therein.

If there is a buckling in the zone to be tested, this results in the presence of a pocket acting as an insulating zone which slows down the advance of the thermal front created by the heat supply inside the sphere, from inside the sphere to the outside. The slowing of the thermal front means that, at the outer surface of the sphere, opposite to the buckling, a thermal gradient will appear and will disturb the isodisplacement lines of said outer surface.

The second holography provides an interferogram whose fringe network accounts for the isodisplacement line disturbances, and therefore indicates the presence of buckling. This is illustrated in FIGS. 8 and 9, the first one showing a regular fringe network of the interferogram of a sound sphere zone, i.e., a zone without any buckling, and the second one representing an interferogram whose fringe network shows irregularities mentioned by arrow S revealing buckling.

The interferogram thus obtained allows not only to indicate the presence of buckling (or several distinct bucklings) but also to locate it and precisely delimit it inside the sphere surface which is illuminated by the recording laser.

The first holography can be made at ambient temperature, i.e., prior to the hot air injection inside the sphere. However, in order to be independent from ambient temperature conditions, and to realize a sequence of several interferograms on the same sphere, during the same temperature increase, and under the same conditions, it is preferable to inject air at controlled temperature and flow into the sphere before the first holography.

The temperature inside the sphere must be controlled so that it departs from ambient temperature without ever exceeding the maximum temperature allowed for the safety of the tank. The maximum temperature is fixed at 50° C. for the "Kevlar" or carbon type tanks aforementioned.

The temperature and flow controlling of the air injected into the sphere 1 allows to control the slope of the temperature increase inside the sphere.

The second holography is carried out a few seconds later. In practice, the taking of the second exposure does not depend on time since it is difficult to appreciate the thermal front transmission time through the wall, from one tank to the other, but it depends on the temperature rise detected with the help of the pyrometer 38 outside the sphere 1.

One can choose, as the threshold of the second holography a temperature rise detected by the pyrometer 38 of 0.1° or 0.2° C., with respect to the moment of the first holography.

The installation whose principle is illustrated in FIG. 3 allows for automatically and successively repeating the making of such interferogram for various parts of the outer surface of the sphere and during one temperature rise of the sphere only, from ambient temperature to the maximum temperature allowed, 50° C., for example.

Actually, there will be as many interferograms as there will be different parts of the sphere 1 which will have to be illuminated by the laser 12 in order to cover the whole surface to be tested.

The method is carried out as follows. First, the sphere 1 to be tested is placed on the supporting and positioning device 9 (FIG. 2). The sphere is positioned so that, as it is shown on FIG. 3, one of its poles or hemisphere (trunnion 4) is oriented towards the recording laser 12. In fact, in order that there be no cast shadow on the holographic image, the beam 11 is positioned so that one of its edges is tangent to the sphere at the level of trunnion 4.

The heating of the sphere 1 is started by sending a hot air controlled flow through the injection device 21. As described above, the air injected into the sphere 1 is homogeneously diffused, and is collected by the pipe 24 and preferably recycled towards the device 21 so as to minimize the heating of the surroundings and particularly of the optical equipment.

The air temperature and flow controlling by means of devices 21,27 allows to control over the slope of the air temperature increase inside the sphere.

FIG. 7 is a chronogram showing the temperature rise of the sphere 1 while it is being tested. The temperature, detected by the pyrometer 38, will go from ambient temperature $\theta a$ to equilibrium temperature $\theta e$ which is slightly lower than maximum temperature $\theta max$ tolerated by the composite material. It is during the rectilinear part of the temperature rise between $\theta a$ and $\theta e$ that the n interferograms will be automatically made under the microcomputer 28 control, said interferogram corresponding to n different parts of the outer surface of the sphere, n parts being necessary and sufficient for covering the entire surface to be tested.

In FIG. 7 only the first two interferograms are shown.

The first interferogram I1 is defined by both image shots P1 and P2 triggered by the signal transmitted by the pyrometer 38.

The first shot P1 is triggered from a temperature threshold beyond ambient temperature, and the second one is triggered once the pyrometer 38 has detected an increase $\Delta\theta$ in temperature equal to 0,1° or 0,2° C. for example, from the moment of the first shot P1.

The laser 12 shots are ordered by the microcomputer 28 which controls and checks, by means of appropriate software, all the parameters of the installation as well as the control of the heating and positioning means of the sphere, of the holographic camera 15 (forward motion of the thermoplastic film, and heating of the latter for its developing).

For each shot or image taken, the microcomputer 28 also controls the tilting of the proof-reading mirror 32 (or the shifting of the mirror 46 in case the FIG. 4 embodiment is used), the switching of the proof-reading laser 31, the image acquisition, via the camera 17, for its storing, and the return to the initial position of the mirrors 32 or 46.

In FIG. 7, there is shown at 60 the orders given by the microcomputer 28 between two interferograms in order to make the thermoplastic film go forward and modify the position of the sphere 1 for the following interferogram.

The sphere 1 can be entirely checked by means of six interferograms, that is, three interferograms according to the orientation of the sphere shown in FIG. 3, the sphere being pivoted only once around the axis of the trunnions 4,5, and three other interferograms (and two revolutions around the axis between trunnions 4,5) after rotating the axis between trunnions 4,5 (via control 37) by 180°. During those movements the pyrometer 38 and the devices 21 and 25 remain stationary.

The picture monitor 33 allows one to visualize each interferogram.

The printer 34 provides a report of the test which have been made.

A function called "manual" allows the operator, via the microcomputer 28, to have access to the elements of the installation, or to program steps (e.g., checkout) phase, adjustments, return to a particular point revealed during testing).

The slope of the temperature rise of the sphere (FIG. 7) may be more or less steep, depending upon the available temperature range between ambient temperature and accepted maximum temperature, and on the number of interferograms made during the same temperature rise. That is why it is important to provide means for checking temperature and air flow injected inside the sphere 1.

Moreover, the air should be clean, free from dust, and dehumidified.

It is possible to inject air at a temperature lower than the ambient temperature, in order to make the same interferogram series as with a temperature increasing slope, but with a temperature decreasing slope, under similar injected air flow and temperature testing conditions.

The use of a gaseous fluid different from air, or of a liquid, for example water, can also be considered.

FIG. 6 shows the embodiment of a testing casing comprising the elements of the installation shown in FIG. 3.

For the operator's security, and for realizing the dark room necessary for the recording of holographic interferograms, the various mechanical and optical components of the installation are placed in a protective case 61 with access flaps or doors 62 for the various handling and interventions such as loading and withdrawing the tank to be tested, or loading the holographic camera.

A control desk and a display screen are provided together and with a keyboard 63 for conversing with the microcomputer 28, the display console 64 of the latter, the monitor 33, and the printer 34.

The method of the invention was described using a fluid injected inside the vessel 1 at a controlled temperature, as a means for applying a thermal stress to the liner 2, but it is also possible to apply such stress with any other means adapted to create the required difference in temperature such as, for example, an infrared radiation source mounted at the end of a rod introduced inside the vessel.

Such source can be substituted to the aforesaid fluid source (21 to 23), without modifying the other parts of the device shown on FIG. 3.

I claim:

1. A method for testing a vessel composed of a composite material wound on a metallic liner for flaws, the method comprising:

taking a first holographic image and a second holographic image of a zone of the vessel, under two different states of thermal cycling, the thermal cycling being homogeneously applied to the entire liner inside the vessel, said first holographic image being taken while the liner is at a first temperature, and the second holographic image being taken after changing the liner from the first temperature to a second temperature different from the first temperature;

generating a holographic interferometry image of the zone of the vessel, by making an interferogram outside the vessel, and controlling the taking of the second holographic image by the detection, outside and near the vessel, of a variation of an outer infrared radiation emitted by the vessel, resulting from a temperature variation undergone by the liner being equal to a predetermined threshold value to provide an indication of movement of a thermal front through said liner including any slowing down of movement of the thermal front by flaws.

2. The method according to claim 1, wherein said liner is changed from said first temperature to said second temperature by raising or lowering the temperature of said vessel.

3. The method according to claim 2, wherein the application of the fluid inside the vessel is made prior to the first holographic image.

4. The method according to claim 2, wherein the first holographic image occurs after the temperature of the vessel has gone from ambient temperature to a rectilinear part of an increasing or decreasing temperature slope resulting from the application of said fluid inside said vessel.

5. The method according to claim 4, wherein the temperature and the flow of the fluid applied inside the vessel are regulated so that the temperature of the vessel is raised or lowered to a degree included between the ambient temperature and a maximum predetermined temperature according to an increasing or decreasing rectilinear curve.

6. The method according to claim 5, wherein a plurality of interferograms are taken one after the other, during the same temperature variation of the vessel.

7. The method according to claim 5, wherein a plurality of interferograms are generated, and for each of said plurality of interferograms, the second holographic image is actuated by the detection, outside and near the vessel, of a temperature variation of the vessel with respect to the temperature when the first holographic image was taken, equal to a predetermined threshold.

8. The method according to claim 7, wherein said temperature variation threshold is about 0.1° to 0.2° C.

9. The method according to claim 2, wherein the fluid applied inside the vessel is air.

10. The method according to claim 1, wherein said liner is raised to said second temperature by introducing inside the vessel an infrared radiation source.

11. The method according to claim 1, wherein after having made a first interferogram by taking said first and second holographic images on a predetermined part of the vessel surface, a second interferogram is made on a second part of said surface, under similar conditions, and the operation is repeated as many times as it is necessary to cover the entire zone to be tested, in order to obtain a total of n interferograms.

12. An apparatus for testing a vessel composed of a composite material wound on a metallic liner, comprising:
- means for supporting the vessel to be tested;
- a holographic camera;
- an optical system comprising a recording laser, a proof-reading laser, and means for optically obtaining an object beam, reference beam, and proof-reading beam;
- means for varying the temperature of the liner of the vessel to be tested;
- means for detecting temperature of the vessel to be tested, said means for detecting temperature being positioned outside and near the vessel, when tested;
- means for taking first and second holographic images, said means being connected to the holographic camera, the recording and proof-reading lasers, and said means for detecting temperature of the vessel to be tested; and
- means for controlling the taking of a second holographic image based on a variation of infrared radiation equal to a predetermined threshold value.

13. The apparatus according to claim 12, wherein said means for supporting the vessel to be tested comprises a fork-shaped support adapted to be connected to ends of the vessel, said fork-shaped support being removably fixed with respect to a symmetrical axis of the vessel, means for pivoting the vessel around said axis, and means for pivoting said fork-shaped support around an axis which is perpendicular to the symmetrical axis of the vessel.

14. The apparatus according to claim 12, wherein said means for varying the temperature of the liner of the vessel comprises means for injecting a fluid inside the vessel, and means for controlling the temperature and flow of the fluid.

15. The apparatus according to claim 14, wherein said means for injecting said fluid inside the vessel comprises a diffusing pipe and an evacuation pipe for the fluid after it has circulated inside the vessel.

16. The apparatus according to claim 15, wherein said evacuation pipe for the fluid is connected to a recycling circuit for recycling the fluid inside the vessel.

17. The apparatus according to claim 12, wherein said means for varying the temperature of the liner of the vessel comprises an infrared radiation source.

18. The apparatus according to claim 12, further comprising means for positioning the vessel to be tested, and means for recording the first and second holographic images, wherein the means for supporting the vessel, the means for positioning the vessel, and the means for recording the first and second holographic images, are mounted on a cushioned frame linked with the ground by a dampening system.

19. The apparatus according to claim 12, further comprising a display camera placed behind the holographic camera and connected to a video monitor.

20. The apparatus according to claim 12, wherein the optical system further comprises a separator comprising a mobile plate so as to present in an axis of a beam from the recording laser and an axis from the proof-reading beam, a plurality of separating blades having characteristics suited to the nature of the composite material of the vessel, in view of an adjustment of a ratio of a length of the reference beam to a length of the object beam.

21. The apparatus according to claim 20, wherein the optical applicator further comprises a blade letting the entire laser beam go through onto a reference arm at a time of proof-reading.

22. The apparatus according to claim 12, further comprising a microcomputer equipped with a printer and connected to various components to be controlled, comprising the holographic camera, the optical system, the means for supporting the vessel, the means for varying the temperature of the liner of the vessel to be tested, means for detecting temperature of the vessel to be tested, said microcomputer being programmed so as to automatically perform an entire interferogram sequence for testing the vessel.

23. The apparatus according to claim 22, further comprising means for positioning the vessel, and a display camera, said means for positioning the vessel being controlled by the microcomputer.

24. The apparatus according to claim 22, further comprising means for positioning the vessel, and a display camera, said means for positioning the vessel being checked by the microcomputer.

* * * * *